United States Patent [19]

Obata et al.

[11] 3,866,827

[45] Feb. 18, 1975

[54] MAGNETIC CARD APPARATUS

[75] Inventors: Atsushi Obata, Kitakata; Mamoru Namikawa, Tokyo, both of Japan

[73] Assignees: Tokushu Seiko Co., Ltd.; Tokyo Magnetic Printing Co., Ltd., both of Tokyo, Japan

[22] Filed: Feb. 16, 1973

[21] Appl. No.: 333,172

[30] Foreign Application Priority Data

Feb. 17, 1972 Japan .............................. 47-17015
Apr. 28, 1972 Japan .............................. 47-50875

[52] U.S. Cl. ....... 235/61.11 D, 235/61.11 E, 360/2, 360/101, 360/107

[51] Int. Cl. .......................... G06k 7/08, G06k 7/10

[58] Field of Search ...... 235/61.11 R, 11 M, 61.7 B; 35/48 R, 48 A, 48 B; 340/174.1 H, 149 A; 179/100.2 R; 360/2, 81, 101, 107

[56] References Cited

UNITED STATES PATENTS

| | | | |
|---|---|---|---|
| 3,571,799 | 3/1971 | Coker, Jr. et al. | 235/61.11 D |
| 3,624,311 | 11/1971 | Van Emden | 235/61.7 B |
| 3,665,163 | 5/1972 | Mast et al. | 235/61.11 D |
| 3,731,061 | 5/1973 | Laybourn | 235/61.11 D |

*Primary Examiner*—Daryl W. Cook

[57] ABSTRACT

A magnetic card apparatus which is provided with a magnetic card insertion slit and a magnetic head moved in ganged relation to a magnetic card inserted from the magnetic card insertion slit and which is adapted so that the magnetic head is returned by spring force to its initial position while scanning the magnetic card.

6 Claims, 10 Drawing Figures

MAGNETIC CARD APPARATUS

BACKGROUND OF THE INVENTION

1. Field of the Invention

This invention relates to apparatus for reading signals recorded on a magnetic card having a magnetic film formed by appropriate means on the surface of a sheet of resinous material, stiff paper or the like.

2. Description of the Prior Art

Recently, magnetic cards are utilized extensively in banking, such as for automating deposits and in various credit card service systems, such as for holder identification and credit authorization, and for automated ticketing such as for commutation tickets, in the railroad business. In this case, it is highly desirable that inquiries from terminal offices to a central processing unit by an on-line or off-line operation for collation and identification are made by a simple and durable device with high reliability in a short time.

Conventional magnetic readers for use with the magnetic card are motor-driven magnetic reproducing devices. With such magnetic readers, the time for reading necessary information recorded on the magnetic card is very short but the time for operating mechanically is comparatively long, so that the utilization factor of the devices is poor. Further, there are the possibilities that long, continuous use of the devices introduces non-uniformity in their operation to cause a change in the scanning speed of a head scanning magnetic tracks and mistracking and disengagement of the head from the surface of the magnetic film while scanning. In addition, the conventional magnetic readers are complicated in construction and in operation and, in case of a failure, repair is also difficult.

SUMMARY OF THE INVENTION

One object of this invention is to provide a magnetic card apparatus of simple and durable construction which is capable of reading out necessary information recorded on a magnetic card with high reliability in a short time.

Another object of this invention is to provide a magnetic card apparatus which is free from bad influences of dust.

The magnetic card apparatus of this invention is characterized by the provision of a magnetic card insertion slit formed at the entrance of a magnetic card guide path, a magnetic head moved in ganged relation to a magnetic card inserted from the slit and means by which when the magnetic card has been inserted to a predetermined position, the magnetic head is released and returned by spring force to its initial position while scanning the surface of the magnetic card.

Further, the magnetic card apparatus of this invention is characterized by the provision of a door at the magnetic card insertion slit to prevent introduction of dust. The door is movable substantially perpendicular with respect to the direction of insertion of the magnetic card to open and shut the slit. The lower end portion of the door is tapered so that when the tip of the magnetic card is urged against the tapered portion, the door is opened.

DESCRIPTION OF THE PREFERRED EMBODIMENTS

Figure 1:
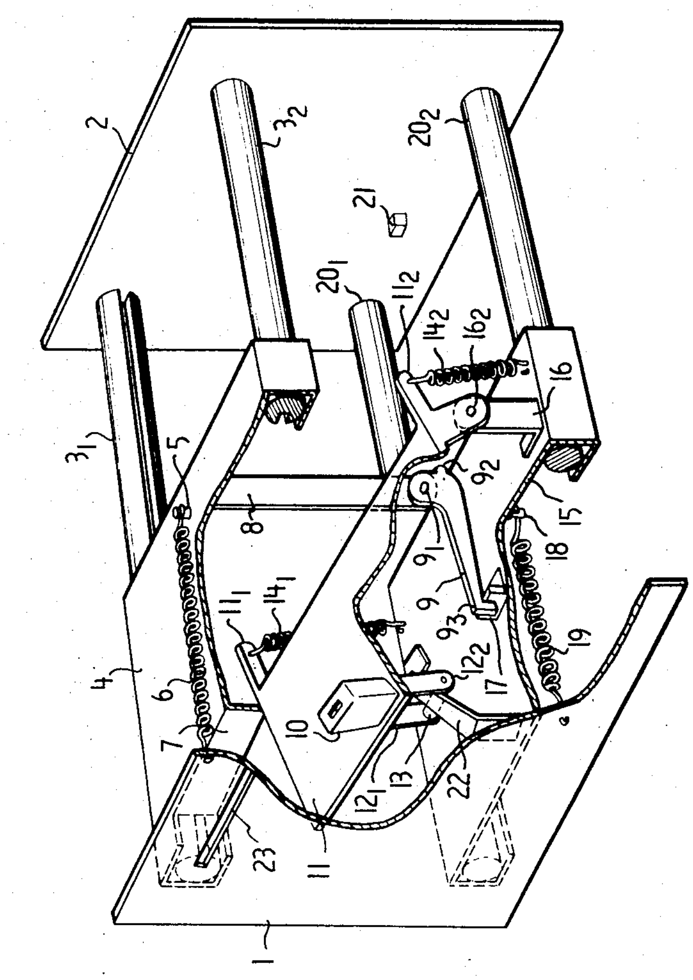
FIG. 1 is a perspective view, partly cut away, showing one example of a magnetic card apparatus of this invention.

This invention will hereinafter be described in detail. In FIG. 1, reference numeral 1 indicates a front panel and 2 a rear panel disposed in parallel therewith. Between the front and rear panels 1 and 2 are fixed grooved guide rods $\mathbf{3}_1$ and $\mathbf{3}_2$, and guide rods $\mathbf{20}_1$ and $\mathbf{20}_2$ in a perpendicular direction with respect to the panels 1 and 2. Each of the grooved guide rods $\mathbf{3}_1$ and $\mathbf{3}_2$ has formed therein a groove running in parallel with its axis and having an appropriate depth and width, and these guide rods are disposed at opposing ends of a magnetic card insertion slit 23 formed in the front panel 1, with their grooves being parallel and opposite with each other. The grooves receive both side marginal portions of a magnetic card, guide the advancement of the magnetic card, define the position of the inserted card and hold it in position. The mechanism for this purpose need not be limited specifically to the illustrated one but may be any mechanism, so long as it serves to guide the inserted magnetic card, define its position and hold it in position.

Figure 2A:
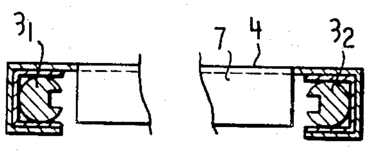
FIGS. 2A and B show in section on an enlarged scale the relationships between guide rods and a sliding plate in the apparatus of this invention.

Reference numeral 4 designates an upper sliding deck, which is slidably mounted on the guide rods $\mathbf{3}_1$ and $\mathbf{3}_2$ (as depicted in FIG. 2A) and smoothly slides thereon between the front and rear panels 1 and 2. On the upper surface of the upper sliding deck 4, a spring retainer 5 is provided and a spring 6 is stretched between the spring retainer 5 and a retainer provided on the front panel 1 at an appropriate position. The spring 6 always pulls the upper sliding deck 4 towards the front panel 1. The upper sliding deck 4 has fixed thereto an arm 8, which, in turn, has coupled thereto a movable arm 9 by means of a pin $\mathbf{9}_1$.

Figure 2B:
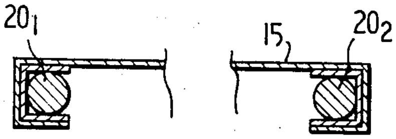

The movable arm 9 has a projection $\mathbf{9}_2$ on the side of the rear panel 2 and a pawl $\mathbf{9}_3$ on the side of the front panel 1. The pawl $\mathbf{9}_3$ is engageable with a lug 17 provided on a lower sliding deck 15. Further, the upper sliding deck 4 has a magnetic card stopper 7 extending vertically downwards therefrom with which the magnetic card strikes when inserted along the grooves of the grooved guide rods $3_1$ and $3_2$ through the insertion slit 23. As shown in FIG. 2B, guide rods $20_1$ and $20_2$ have slidably mounted thereon the lower sliding deck 15 in parallel with the upper deck 4 in a manner to permit smooth sliding movement of the deck 15 between the front and rear panels 1 and 2, as is the case with the upper deck 4. Further, the lower sliding deck 15 has also provided thereon a spring retainer 18, and a spring 19 is stretched between it and the front panel 1 to pull the lower sliding deck 15 towards the front panel 1 at all times. On the lower sliding deck 15, there are mounted brackets 16 in opposing relation to each other, which support a magnetic head support plate 11 for rotational movement by shafts $16_1$ and $16_2$. The magnetic head support plate 11 supports thereon a magnetic head 10 at a position adjacent the front panel 1. Further, the magnetic head support plate 11 has two arms $11_1$ and $11_2$, and springs $14_1$ and $14_2$ are stretched between the tips of the arms $11_1$ and $11_2$ and appropriate positions on the lower sliding deck 15 to pull down the tips of the arms $11_1$ and $11_2$ at all times. As a result of this, the magnetic head support plate 11 is moved up and down about the pair of rotary shafts $16_1$ and $16_2$ provided on the lower sliding deck 15, just like a seesaw. Since the arms $11_1$ and $11_2$ are always pulled down by the springs $14_1$ and $14_2$, the magnetic head 10 is always urged to its uppermost position.

Further, the magnetic head support plate 11 has two downward arms $12_1$ and $12_2$ at appropriate positions adjacent the front panel 1 and the arms $12_1$ and $12_2$ support therebetween a roller 13. An arm 22 is fixed at one end on the inside of the front panel 1 to extend to a position to engage the roller 13.

Figure 3:
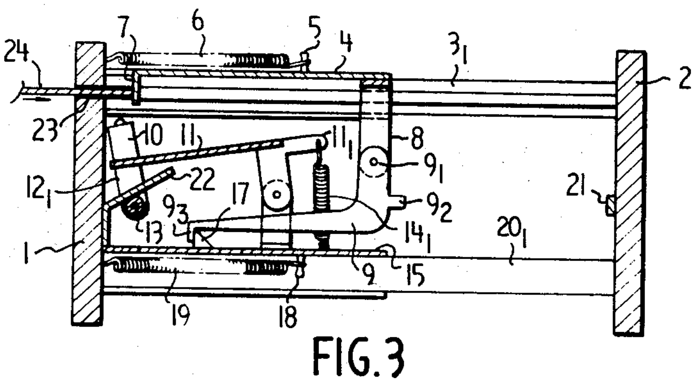
FIG. 3 is a longitudinal sectional view of the apparatus of this invention, showing the relationships between respective parts and a magnetic card at the time of initiating the insertion of the latter.
Figure 4:
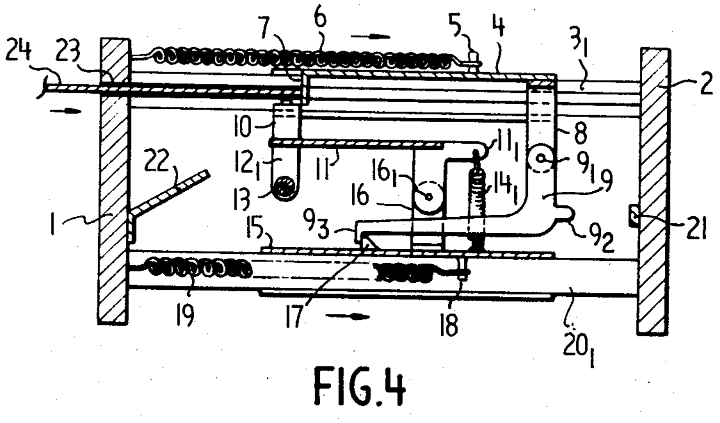
FIG. 4 is a longitudinal sectional view of the apparatus, showing the relationship between the respective parts and the magnetic card while the latter is being inserted.
Figure 5:
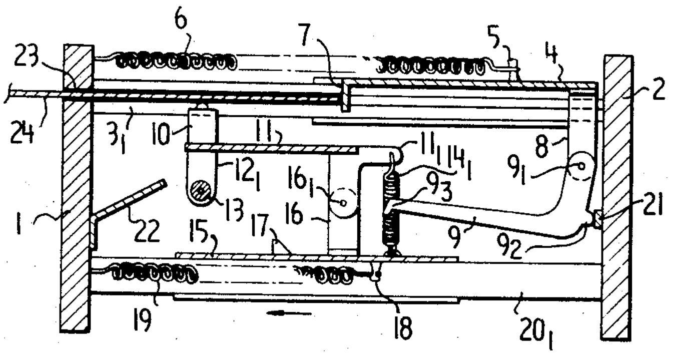
FIG. 5 is a longitudinal sectional view of the apparatus showing the relationships between the respective parts and the magnetic card while a magnetic head is scanning on magnetic tracks formed on the magnetic card to read information recorded thereon.

A spring 19 is stretched between the front panel 1 and a spring retainer 18 provided on the underside of the lower sliding deck 15. While the lower sliding deck 15 is being pulled by the spring 19 towards the front panel 1, the roller 13 is guided down by the arm 22 as it approaches the front panel 1. The front portion of the magnetic head support plate 11, mounted on the lower sliding deck 15 just like a seesaw, is brought down against the force of the springs $14_1$ and $14_2$, and the magnetic head support plate 11 is inclined forwardly, so that the magnetic head 10 is also brought down as depicted in FIG. 3. Then, when a magnetic card 24 is inserted into the magnetic card insertion slit 23, it strikes against the magnetic card stopper 7 of the upper sliding deck 4. At this stage, the magnetic head 10 is pulled down by the inclined arm 22 and the roller 13, so that the head 10 does not hinder advancement of the magnetic card 24. As depicted in FIG. 4, when the magntic card 24 is further pushed in while urged against the stopper 7, the upper sliding deck 4 is moved towards the rear panel 2 against the force of the spring 6. Because the pawl $9_3$ of the movable arm 9 linked with the arm 8 through the pin $9_1$ is engaged with the lug 17 on the lower sliding deck 15, the lower sliding deck 15 is also moved towards the rear panel 2 against the force of the spring 19 together with the upper sliding deck 4. As a result of this, the magnetic head support plate 11 mounted on the lower sliding deck 15 is also moved back to disengage the roller 13 from the inclined arm 22, and the magnetic head support plate 11 is rotated about the pins $16_1$ and $16_2$ on the lower sliding deck 15 by the springs $14_1$ and $14_2$ to raise and direct the magnetic head 10 against the magnetic card 24. The dimensions of the respective parts are selected so that the magnetic head 10 may be pressed against a magnetic card 24 disposed in a position against the magnetic card stopper 7. When the magnetic card 24 is further inserted, the upper sliding deck 4 strikes against rear panel 2 and stops, and at the same time, the projection $9_2$ of the movable arm 9 also strikes against a lug 21 provided on the inside of the rear panel 2 to direct the movable arm 9 about the pin $9_1$ to disengage its pawl $9_3$ from the lug 17 of the lower sliding deck 15, as shown in FIG. 5. As a result of this, the lower sliding deck 15 is released from the upper sliding deck 4 and starts to move towards the front panel 1 by the force of the spring 19. At this time, since the magnetic card 24 is held in its innermost position while pressing the upper sliding deck 4 on the rear panel 2 against the force of the spring 6, the magnetic head 10 moves towards the front panel 1 together with the lower sliding deck 15 while being held in contact with the magnetic card 24 by the force of the spring 14. Namely, the magnetic head 10 scans magnetic tracks formed on the magnetic card 24 to read out signals recorded thereon. When the lower sliding deck 15 is brought close to the front panel 1 by the force of the spring 19 and as the roller 13 mounted under the forward portion of the magnetic head support plate 11 engages the inclined arm 22 mounted on the front panel 1 to be pulled down thereby, the magnetic head support plate 11 is rotated about the pins $16_1$ and $16_2$ to be inclined forwardly to pull the magnetic head 10 away from the magnetic tracks of the magnetic card 24, thus completing the scanning and reading operation. Then, the lower sliding deck 15 is returned to its original condition.

The mechanism for moving the lower sliding deck 15 towards the front panel 1 for scanning the magnetic head on the magnetic tracks need not always be limited to the illustrated one, but may be a spring mechanism which is capable of pulling the lower sliding deck 15 towards the front panel 1 without hindering the movements of the upper sliding deck, the magnetic head support plate or the other mechanisms. Then, when the magnetic card 24 is removed, the upper sliding deck 4 is returned towards the front panel 1 by the force of the spring 6 and, at the same time, the projection $9_2$ of the movable arm 9 is also disengaged from the lug 21 formed on the rear panel 2. Thus, the pawl $9_3$ is lowered and moved towards the front panel 1 on the upper surface of the lower sliding deck to engage the inclined face of the lug 17 and to fasten over its front edge when the upper sliding deck 4 is returned to its initial position in contact with the front panel 1. Thus, the upper and lower sliding decks 4 and 15 are coupled again with each other to return all the mechanisms to their initial positions, completing the operation of reading out the signals recorded on the magnetic card 24. Thereafter, the same operation is repeated for reading out signals recorded on the next magnetic card.

The magnetic card apparatus of this invention does not employ any drive source such as a motor, a magnetic solenoid or the like, but effectively utilizes a small amount of force produced by insertion of the magnetic card and the compression force of springs for relative movement of the magnetic card and the magnetic head to provide apparatus that is simple in construction, durable, inexpensive and highly reliable.

Another example of this invention will hereinbelow be described in which a door is provided at the magnetic card insertion slit.

Generally, the slit is relatively small in area, so that there is no need of providing a complicated and expensive automatic door. In many cases, no door is provided because of trouble in opening and closing the door of the slit. In practice, however, the reading-out member of the magnetic card apparatus is susceptible to the influence of dust, whether it is of an optical or magnetic type. Thus, it is desirable that the reading-out member be shielded from such particles while the apparatus is not in read-out operation.

Figure 6:
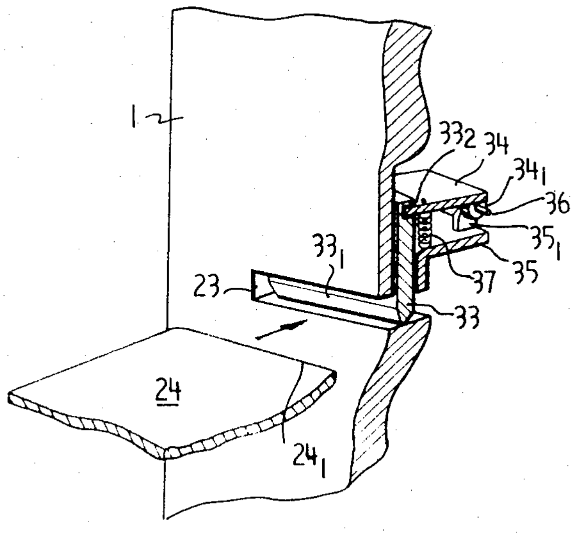
FIG. 6 is a perspective view, partly cut away, illustrating a door provided at a magnetic card insertion slit.

FIG. 6 is a perspective view, partly cut away, showing another example of this invention in which a door is provided at the magnetic card insertion slit.

Reference numeral 1 indicates the front panel of the magnetic card reader, in which the magnetic card insertion slit 23 is formed. On the inside of the front panel 1, that is, on the inside of the magnetic card reader, there is provided a guide rail, groove or the like and a plate-like door 33 is fitted therein and adapted for smooth movement in a perpendicular direction with respect to the surface of the card inserted into the slit 23. The lower end portion of the door 33 corresponding to the slit 23 is formed in the shape of a wedge as indicated by $33_1$, so that when the magnetic card 24 is inserted into the slit 23, the tip $24_1$ of the card 24 makes contact with the inclined face of the wedge-shaped portion $33_1$. Further, a groove $33_2$ is formed in the upper end portion of the door 33 to receive a door keep plate 34.

The door keep plate 34 has lugs $34_1$ which are coupled by a pin 36 with lugs $35_1$ provided on a support 35 fixed to the front panel 1. Namely, the door keep plate 34 is hinged about the pin 36 to be rotated thereabout in response to opening and closing the door 33.

The door keep plate 34 and the support 35 are always pulled to each other to close the door by a spring 37 provided at an appropriate position between the pin 36 and the door 33. The wedge-shaped lower end portion $33_1$ of the door 33 is held at the bottom of the card insertion slit to close the slit 23.

Figure 7:
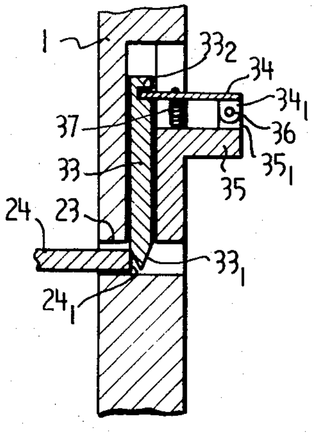
FIGS. 7 to 9, inclusive, are longitudinal sectional views, showing the operation of the door.

When the card 24 is inserted into the slit 23, its tip $24_1$ makes contact with the tapered face of the wedge-shaped portion of the door 33, as depicted in FIG. 7.

Figure 8:
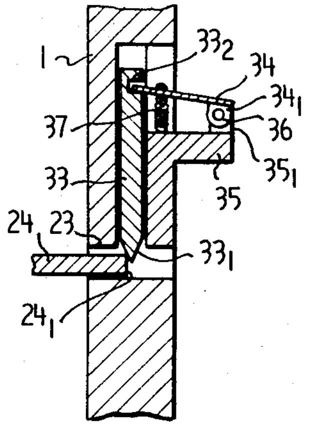
Figure 9:
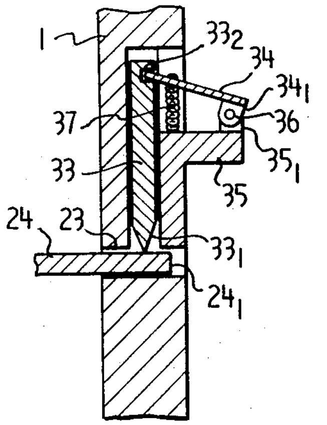

When the card 24 is further pushed forward, the tapered face of the wedge-shaped portion $33_1$ is pushed up by the tip $24_1$ of the card 24 as shown in FIG. 8 and then the card 24 is inserted while sliding between the bottom of the slit 23 and the tip of the wedge-shaped portion 1. 1.

When the card 24 has been completely inserted into the magnetic card reader, the door 33 is then brought down to its lowermost position by the force of the spring 37 to close the slit 23. Also when the card 24 is ejected upon completion of the operation in the magnetic card reader, the outer end of the card 24 similarly engages the tapered face of the wedge-shaped portion $33_1$ to push it up to open the door 33.

In a magnetic card reader of the type that the card 24 is not completely inserted therein, it is also possible to form the wedge-shaped portion $33_1$ to have the tapered face only on one side.

Although the foregoing examples have been described in connection with the case where the card is inserted in a horizontal direction, the card may be inserted vertically or aslant. Further, the respective mechanisms need not be limited specifically to the illustrated ones in the foregoing.

The door of the magnetic card reader constructed as described above can be opened and closed by utilizing any portion of the card to be inserted, and it serves to protect the reading-out member from dust while the magnetic card reader is not in operation.

It will be apparent that many modifications and variations may be effected without departing from the scope of the movel concepts of this invention.

What is claimed is:

1. Apparatus for reading data recorded on a surface of an information bearing medium, said apparatus comprising:

means including first and second guide rods having opposing grooves formed therein and defining a guide path between a first entrance position and a second position for receiving an information bearing medium to be directed along said guide path, a first assembly movable along said first and second guide rods in response to the insertion of the information bearing medium, first spring means for urging said first assembly against movement from the first to the second position, a read head assembly and third and fourth guide rods for receiving said read head assembly for movement along said third and fourth guide rods and adjacent said guide path, release means including a detent arm pivotally mounted upon said first assembly for engaging said read head assembly, whereby upon insertion of the information bearing medium, said first assembly and said read head assembly are moved toward said second position, second spring means for biasing said read head assembly toward said first position, said release means being responsive to disposition of said read head assembly at said second position for releasing said read head assembly to permit said second spring means to move said read head assembly toward said first position, and said read head assembly further including a read head support member, carrying a read head thereon, pivotally mounted upon said read head assembly and biased to direct said read head toward said guide path, whereby said read head scans the surface of the information bearing medium during movement by said second spring means of said read head assembly from said second to said first position.

2. Apparatus for reading data as claimed in claim 1, wherein there is included third spring means for urging said head support member toward said guide path, and a cam surface fixedly disposed with respect to said guide surface for engaging said head support member as it is disposed toward said first position to move said read head from said guide path, whereby the information bearing medium may be directed into said guide path free of said read head.

3. Apparatus for reading data as claimed in claim 1, wherein said release means includes trigger means fixedly disposed with respect to said guide path to engage said detent arm when said second assembly is disposed at said second position to thereby release said detent arm for movement from a first position wherein said detent arm engages said read head assembly to a second position wherein said detent arm is free of said read head assembly.

4. Apparatus for reading data as claimed in claim 1, whrein the information bearing medium is magnetically encoded in accordance with the stored data, and said read head is responsive to the magnetic encoding to provide a corresponding output signal.

5. Apparatus for reading data as claimed in claim 1, wherein the information bearing medium is optically encoded in accordance with the stored data, and said read head is responsive to radiation modulated by the information bearing medium to provide a corresponding output signal.

6. Apparatus for reading data recorded on a surface of an information bearing medium, said apparatus comprising:

means for receiving and directing an information bearing medium in a guide path between a first entrance position and a second position, said means including first and second guide rods having opposing grooves formed therein and defining said guide path, means defining an entrance opening to said guide path, a door movable from a first position blocking said entrance opening to a second position permitting insertion of an information bearing medium into said guide path, spring means for biasing said door to its first position, and said door having an edge portion comprising a cam surface for engagement by an information bearing medium to dispose said door toward its second position, a read head assembly including a read head disposable adjacent said guide path for providing output signals in accordance with the data recorded on the information bearing medium received in said guide path, said read head assembly being responsive to the movement of the information bearing medium from the first to the second position to move said read head toward said second position, second spring means for biasing said read head assembly toward said first position thereof, and release means responsive to the disposition of said read head assembly at said second position for releasing said read head assembly to permit said spring means to move said read head assembly toward said first position, whereby said read head scans the surface of the information bearing medium.

* * * * *